United States Patent [19]

Barthelemy et al.

[11] 4,194,616
[45] Mar. 25, 1980

[54] HELICAL CONVEYORS

[76] Inventors: Louis Barthelemy, Residence Longchamp, Villier le Mehieu, 78770 Thoiry; Roger S. Barbedienne, Rue de Neuville, 95610 Eragny-sur-Oise, both of France

[21] Appl. No.: 885,185

[22] Filed: Mar. 10, 1978

[30] Foreign Application Priority Data

Mar. 11, 1977 [FR] France .................... 77 08095

[51] Int. Cl.² .................... B65G 17/12; B65G 21/18
[52] U.S. Cl. .................... 198/778; 198/321
[58] Field of Search .......... 198/321, 328, 778, 833, 198/845, 850; 104/25

[56] References Cited

U.S. PATENT DOCUMENTS

| | | | |
|---|---|---|---|
| 782,009 | 2/1905 | Dodge | 198/321 |
| 792,623 | 6/1905 | Souder | 198/328 |
| 984,495 | 2/1911 | Seeberger | 198/328 |
| 3,749,224 | 7/1973 | Engeler | 198/331 |
| 3,878,931 | 4/1975 | Luna | 198/328 |
| 3,881,592 | 5/1975 | Stimpson | 198/845 |

FOREIGN PATENT DOCUMENTS 852012 1/1940 France .................... 198/321

*Primary Examiner*—Jeffrey V. Nase
*Attorney, Agent, or Firm*—Karl F. Ross

[57] ABSTRACT

A passenger-carrying conveyor-elevator has a helical track formed by a pair of spaced apart rails in which rollers of a succession of platforms ride. The platforms are of trapezoidal configuration with sides extending along radii of the helix and are connected together at their undersides by a flexible belt which is toothed to engage cog wheels of respective motor units driving the system.

3 Claims, 10 Drawing Figures

HELICAL CONVEYORS

BACKGROUND OF THE INVENTION

1. Field of the Invention

This invention relates to helical conveyors and in particular to ascending and descending conveyor-elevators.

2. Description of the Prior Art

It has hitherto been proposed to construct a conveyor-elevator as a continuous band or belt moving over a set of rollers. However, such an arrangement suffers from the drawback that when used for conveying people, the passengers feel the passage of the belt over the rollers and this is generally unpleasant.

OBJECT OF THE INVENTION

It is an object of the present invention to provide a continuous conveyor-elevator which avoids this drawback.

SUMMARY OF THE INVENTION

According to the invention, there is provided a helical conveyor comprising a helical track and a continuous train of load-bearing support elements arranged to pass around and along the helical track, each support element including roller means which engage the track to guide and support the element therealong, and each support element being of trapezoidal shape with two sides extending radially of the helical track, the radially extending sides of adjacent support elements being juxtaposed.

In one form of the conveyor, each support element is constituted by a platform mounted on a carriage bearing the roller means, the carriages being joined together in an articulated manner. Such an arrangement can be driven by causing the carriages to pass successively over a driving wheel.

In an alternative form of the conveyor, the support elements are independent of one another and engage a continuous driving member which extends parallel to the track and is driven by drive means of the conveyor.

The return pass of the track may be disposed under the forward pass of the track.

Two conveyors may be disposed coaxially so that conveying capacity is doubled for an overall size smaller than that of two single conveyors.

BRIEF DESCRIPTION OF THE DRAWING

Several forms of helical conveyor-elevator each embodying the invention, will now be particularly described, by way of example, with reference to the accompanying diagrammatic drawings, in which.

DESCRIPTION OF THE PREFERRED EMBODIMENTS

Figure 1:
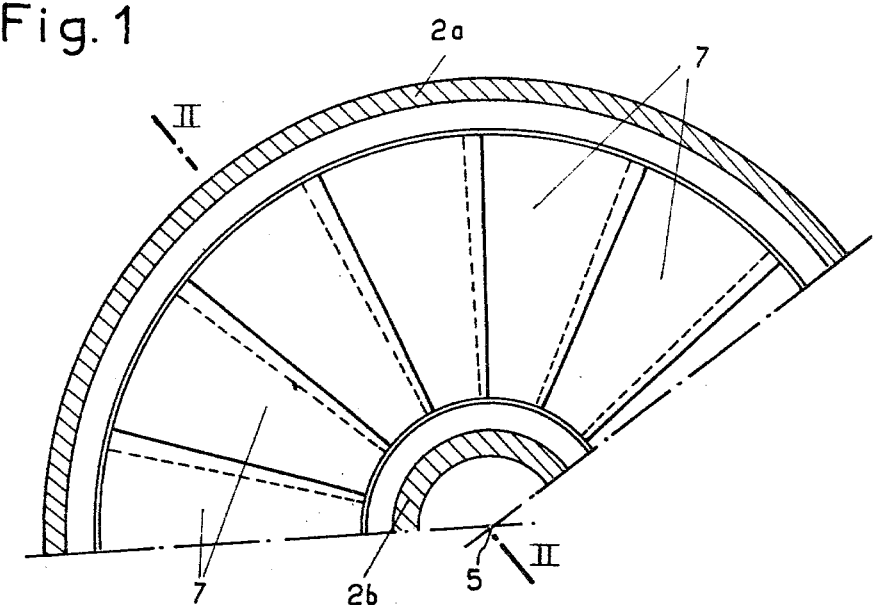
FIG. 1 is a plan view of part of a first embodiment of the conveyor.

As shown in FIGS. 1 to 5, the first embodiment of the conveyor comprises a helical track formed by two rails 1a and 1b which are spaced from each other by a predetermined and constant amount and are mounted on vertical walls 2a and 2b respectively. The helical track may extend over a full turn, over a fraction of a turn or over several turns.

Load-carrying support elements in the form of carriages 3 are arranged to pass along and around the track formed by the rails 1a and 1b. Each carriage 3 comprises a triangular frame 4 (for example of tubular members) formed by two long members 4a extending along respective imaginary lines passing through the axis 5 of the helical track, and a shorter member 4b also extending towards the track axis on the radially inner side of the carriage 3. The radially outer ends of the longer members 4a carry roller means in the form of respective rollers 6a which engage the outer rail 1a; the shorter member 4b has a roller 6b at its radially inner end which engages the inner rail 1b. These rollers 6a and 6b are grooved in such a manner as to ensure lateral guiding of the carriage 3. A platform 7 is fixed on the frame 4 and in the present example the radially inner and outer ends of this platform are turned down to form support brackets 7a through which the members 4a and 4b of the frame 4 pass.

The carriages 3 are joined together into a continuous train by means of small rods 8 which are hinged on the frame members 4a. The platforms 7 are trapezoidal in form with two sides extending radially of the helical track. The platforms 7 are dimensioned such that the radially-extending sides of adjacent platforms 7 are juxtaposed each other, the region of juxtaposition of adjacent platform edges being covered by a hinged plate 9 provided on one of the platforms 7 along the appropriate radially-extending side.

Figure 2:
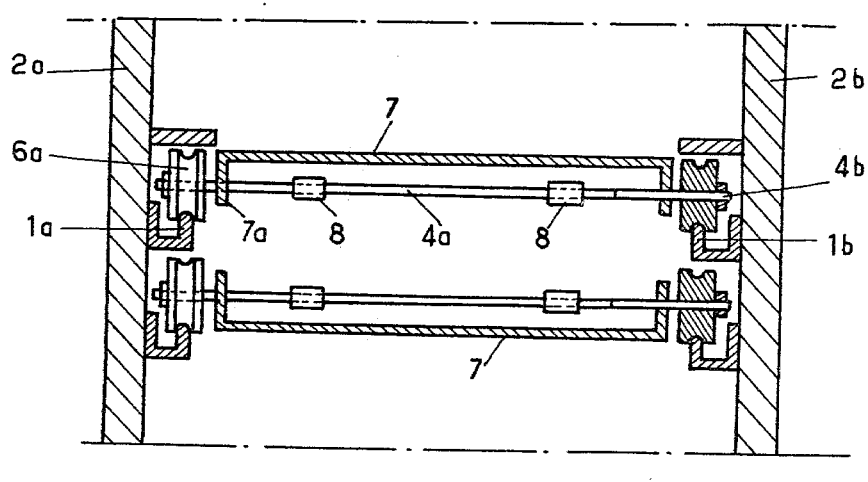
FIG. 2 is a cross-section on line II—II of FIG. 1.
Figure 3:
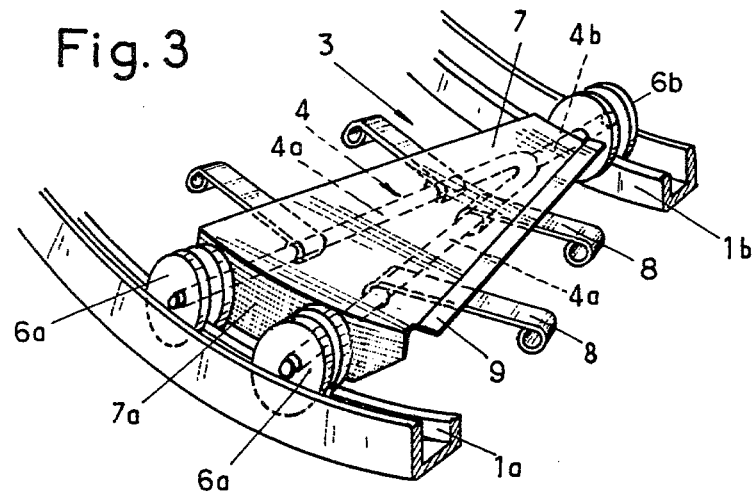
FIG. 3 is a perspective view of a carriage of the first form of the conveyor.
Figure 4:
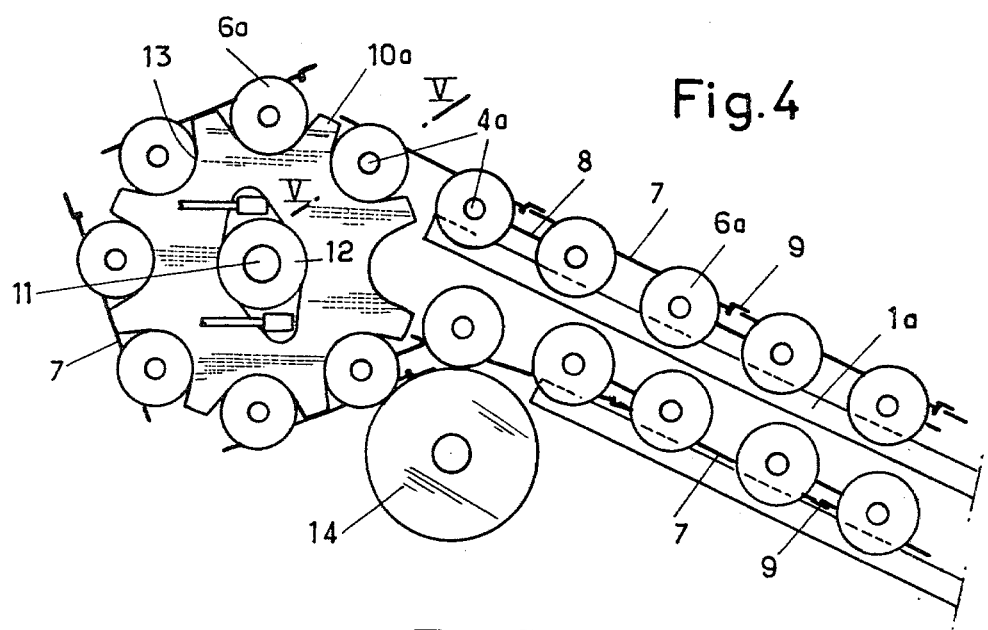
FIG. 4 is an elevation of a driving wheel of the first form of the conveyor.
Figure 5:
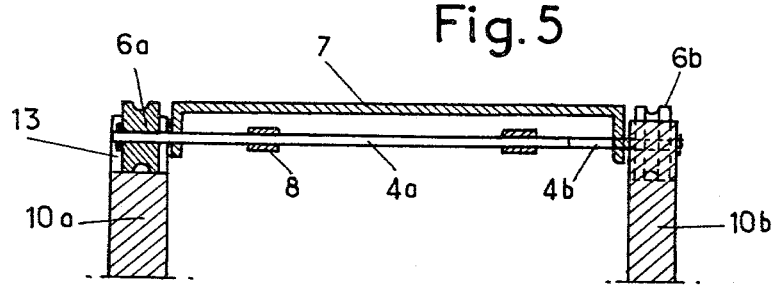
FIG. 5 is a cross-section on line V—V of FIG. 4.

The continuous train formed by the carriages 3 passes over a pair of driving wheels 10a and 10b at the upper end of the conveyor and over a pair of similar return wheels at its lower end (these latter wheels not being illustrated). The return, downward, portion of the helical track is disposed below the ascending portion, as can be seen in FIG. 2.

The two driving wheels 10a and 10b are connected to the output shaft 11 of a driving motor by a reversible coupling 12 of ball or roller type arranged to prevent reversal of direction of operation of the conveyor under adverse load conditions. The wheels 10a and 10b are provided around their periphery with grooves 13 arranged to engage the rollers 6a and 6b, the number of the grooves 13 of wheel 10b being half that of the grooves 13 of wheel 10a. A pair of guide wheels 14 is disposed below the wheels 10a and 10b. The rails 1a and 1b stop short of the wheels 10a and 10b, as can be seen in FIG. 1.

In operation, the platforms 7 form a practically continuous helical path whose length (and, consequently, degree of raising) can be very great. As the platforms 7 are supported on carriages 3, users will not feel as if they were travelling over a bumpy surface as is the case with belts moving over rollers. By reversing the direction of rotation of the driving motor and suitably operating the coupling 12, it is possible to operate the conveyor both as a lifting and a lowering unit.

If the conveyor breaks down, its conveying surface formed by the platforms 7 remains usable; in particular, it is unnecessary to provide additional means to ensure that its users are not trapped, even in the case of physically handicapped persons in invalid carriages. The coupling 12 prevents the operation of the conveyor in its reverse direction as a result of the weight of its users.

Figure 6:
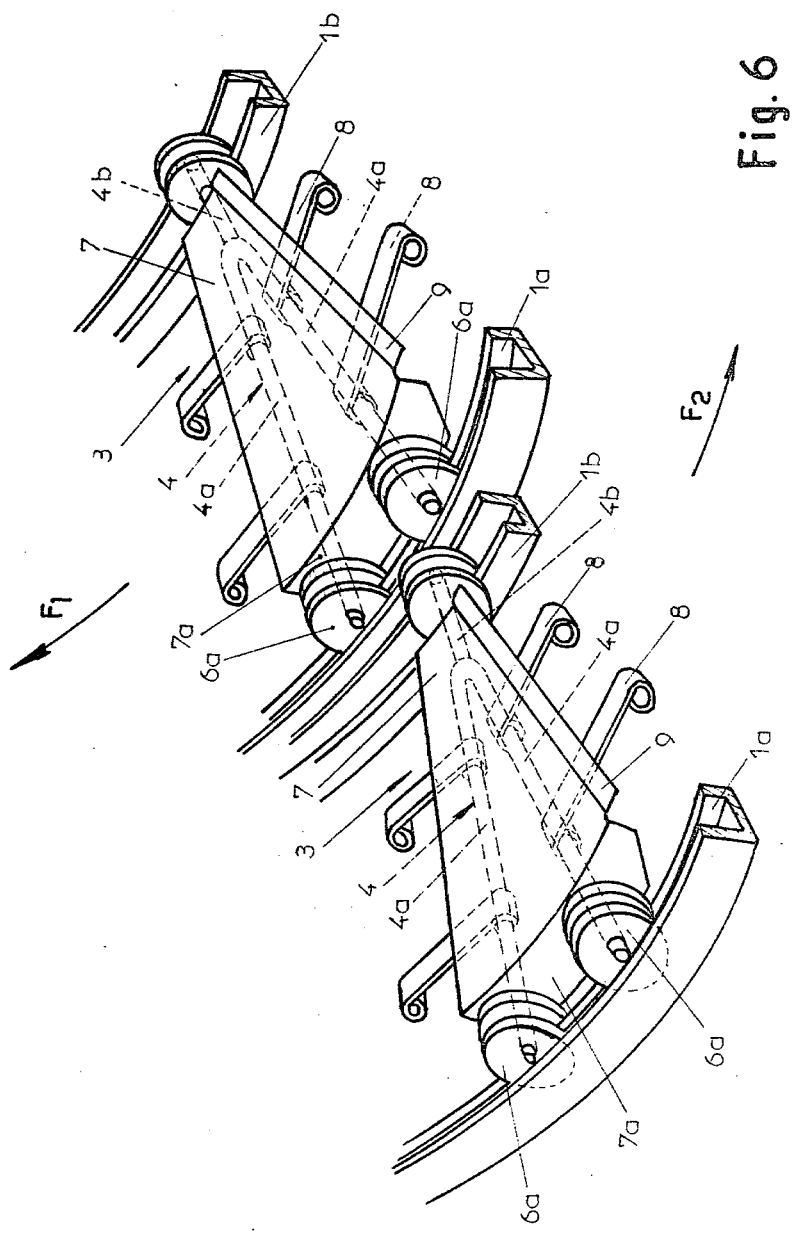
FIG. 6 is a perspective view of part of a second form of the conveyor.
Figure 7:
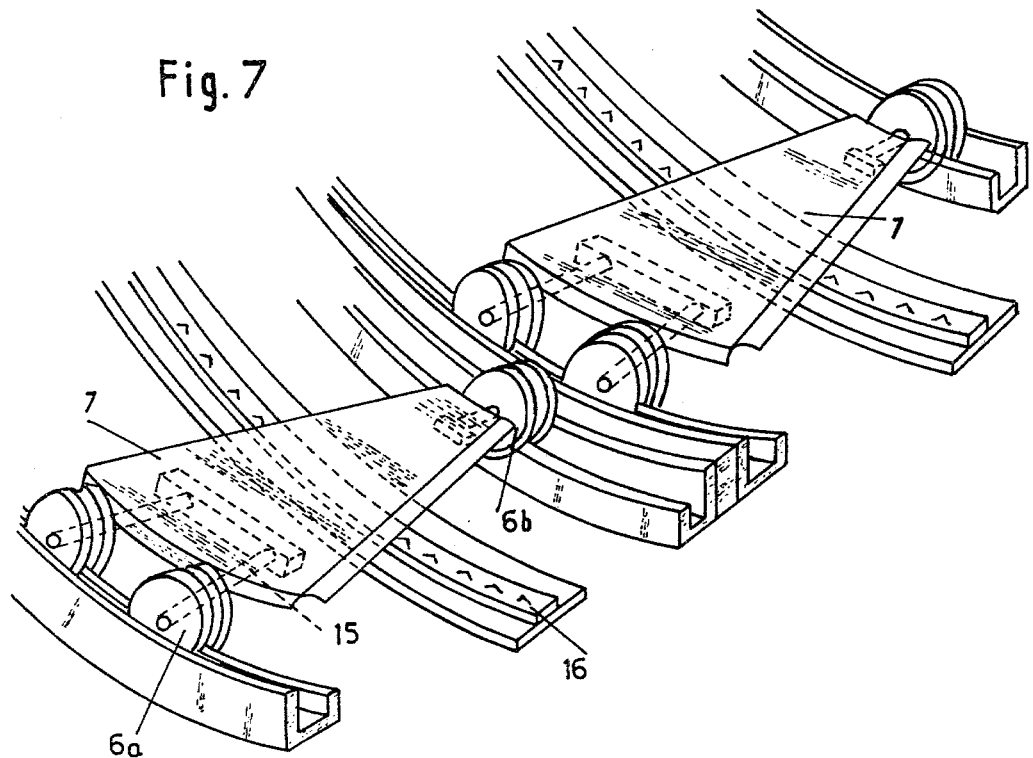
FIG. 7 is a perspective view similar to FIG. 6, of part of a third form of the conveyor.
Figure 10:
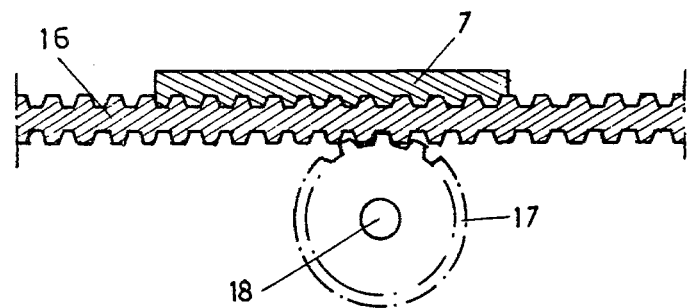
FIG. 10 is a cross-section showing a platform and driving belt of the third form of the conveyor.
Figure 8:
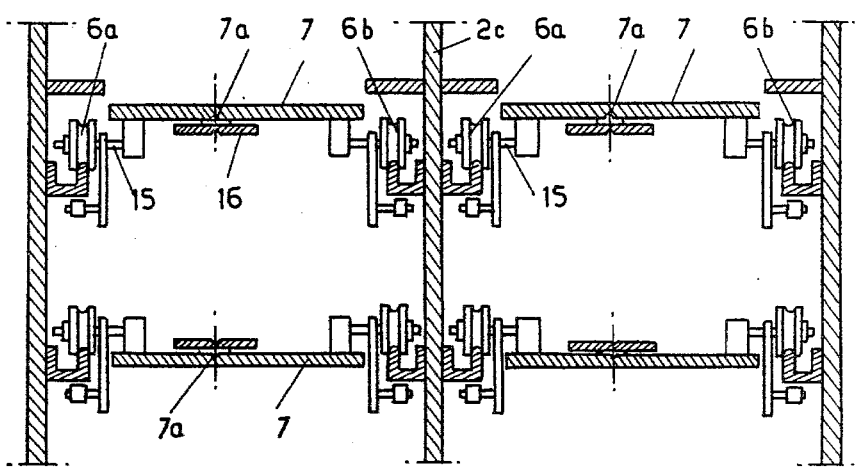
FIG. 8 is a cross-section of the third form of the conveyor.
Figure 9:
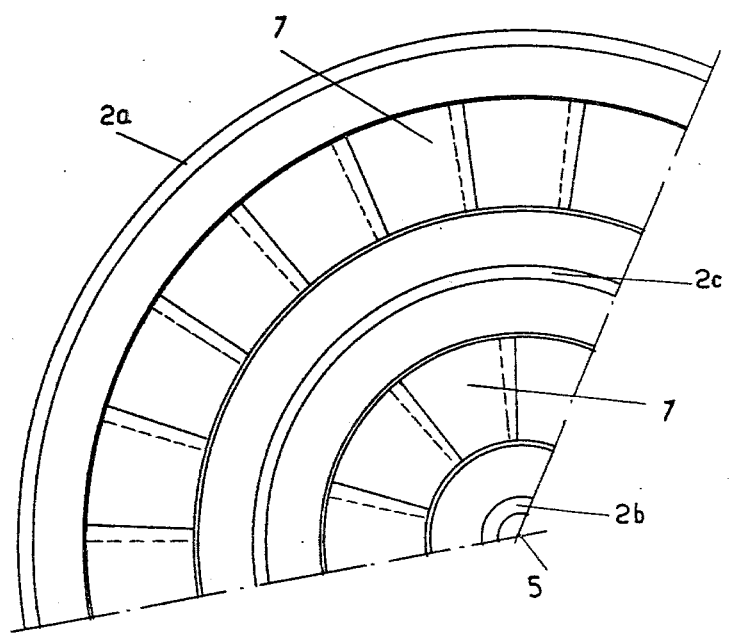
FIG. 9 is a plan view similar to FIG. 1 of part of the third form of the conveyor.

In a second form of the conveyor (FIG. 6), two conveyors similar in form to that just described, are disposed coaxially relatively to each other. One of these conveyors is driven in the direction of the arrow $F_1$ and acts as a lifting unit while the other conveyor is driven in the opposite direction (arrow $F_2$) and acts as a lowering unit.

In the third embodiment (FIGS. 7 to 10), the frame 4 is dispensed with, and the rollers 6a and 6b are pivotably mounted on axles 15 directly supported by the platform 7. The lower face of said platform 7 is toothed or notched, as shown at 7a and engages with a belt 16 notched on both sides. The belt 16 is driven by toothed drive pulleys 17 each of which is connected to a fixed motor-reducer unit 18.

In the third embodiment, two conveyors are again disposed coaxially and may be separated by a wall 2c. The belts 16 of the two individual conveyors are driven in opposite directions with forward and return runs of each belt lying one above the other. One of the conveyors is arranged to act as an elevator and the other as a lowering unit.

We claim:
1. A conveyor-elevator system comprising:
an upright structure having a pair of walls;
a helical track disposed in said structure and formed with a pair of rails fixed to said walls;
an endless conveyor rolling on said track, said conveyor comprising:
a succession of closely juxtaposed platforms of trapezoidal configuration having converging edges lying along radii of a helix formed by said track,
a pair of rollers journaled to said platform and engaging one of said tracks along a broad side of each platform, and a further roller journaled on each platform and engaging the other track along the narrow side of each platform, and
a flexible belt yieldably interconnecting said platforms centrally and extending over the length of the conveyor, said belt being toothed along its side turned away from said platforms, said belt being disposed along the undersides of said platforms; and
a plurality of drive units in said structure spaced along said conveyor and each including:
a cog wheel engaging the teeth of said belt, and
motor means connected to said cog wheel for driving same, each of said motor means including a speed reducer.
2. The conveyor elevator defined in claim 1 wherein two such tracks, conveyors and respective motor means are provided within said structure for lifting and lowering passengers respectively.
3. The conveyor elevator defined in claim 1 wherein a further helical track with respective rails is provided below the first mentioned track and forms a return pass for the conveyor.

* * * * *